(12) United States Patent
Yokoyama

(10) Patent No.: US 12,294,680 B2
(45) Date of Patent: May 6, 2025

(54) IMAGE READING APPARATUS, IMAGE READING METHOD, AND NON-TRANSITORY RECORDING MEDIUM

(71) Applicant: Akira Yokoyama, Kanagawa (JP)

(72) Inventor: Akira Yokoyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/602,279

(22) Filed: Mar. 12, 2024

(65) Prior Publication Data
US 2024/0323292 A1 Sep. 26, 2024

(30) Foreign Application Priority Data

Mar. 20, 2023 (JP) .................................. 2023-044574
Dec. 1, 2023 (JP) .................................. 2023-204196

(51) Int. Cl.
H04N 1/38 (2006.01)
H04N 1/00 (2006.01)
H04N 1/40 (2006.01)

(52) U.S. Cl.
CPC ..... *H04N 1/00859* (2013.01); *H04N 1/00482* (2013.01); *H04N 1/00824* (2013.01); *H04N 1/0084* (2013.01)

(58) Field of Classification Search
CPC ........... H04N 1/00859; H04N 1/00856; H04N 1/00482; H04N 1/0048; H04N 1/00824; H04N 1/00843; H04N 1/00838; H04N 1/00832
USPC ....................................................... 358/462
See application file for complete search history.

(56) References Cited

U.S. PATENT DOCUMENTS

| 2007/0052980 A1* | 3/2007 | Lee ..................... H04N 1/00875 358/1.15 |
| 2007/0206754 A1* | 9/2007 | Ueda .................... H04N 1/4446 379/201.01 |
| 2009/0268259 A1* | 10/2009 | Kikuchi ............. H04N 1/32128 358/468 |

(Continued)

FOREIGN PATENT DOCUMENTS

| JP | 2010-035071 A | 2/2010 |
| JP | 2010-074381 A | 4/2010 |

OTHER PUBLICATIONS

IP.com search history (Year: 2024).*
ProQuest search history (Year: 2024).*
U.S. Appl. No. 18/389,230, filed Nov. 14, 2023.

*Primary Examiner* — Moustapha Diaby
(74) *Attorney, Agent, or Firm* — XSENSUS LLP

(57) ABSTRACT

An image reading apparatus includes a scanner to read a document, a memory to store an address and a job condition of the document read by the scanner, and circuitry to identify a user, send the document read by the scanner to the address under the job condition, determine whether a type of the document read by the scanner is a confidential document, search a number of times the confidential document has been sent to the address in the memory when the type of the document is determined as the confidential document, and display, on a screen, a message whether to send the document read by the scanner to the address under the job condition when the number of the times is less than a predetermined times.

9 Claims, 16 Drawing Sheets

(56) References Cited

U.S. PATENT DOCUMENTS

| | | | | |
|---|---|---|---|---|
| 2010/0277763 A1* | 11/2010 | Aoyama | ................. | G06F 21/34 |
| | | | | 726/19 |
| 2011/0026074 A1* | 2/2011 | Nakamura | ........... | H04N 1/3878 |
| | | | | 358/1.15 |
| 2012/0147436 A1* | 6/2012 | Nishiyama | ......... | H04N 1/32096 |
| | | | | 358/406 |
| 2013/0308167 A1* | 11/2013 | Nishiyama | ......... | H04N 1/00209 |
| | | | | 358/402 |
| 2015/0146243 A1* | 5/2015 | Tsujimoto | ............ | H04N 1/4433 |
| | | | | 358/1.15 |
| 2019/0222713 A1* | 7/2019 | Nakabayashi | ..... | H04N 1/32096 |
| 2021/0195039 A1* | 6/2021 | Tomita | ............... | H04N 1/00214 |
| 2021/0289098 A1* | 9/2021 | Mori | ................. | H04N 1/32128 |
| 2022/0247872 A1* | 8/2022 | Onogi | ................ | H04N 1/32117 |

* cited by examiner

FIG. 6

PERSONNEL ASSESSMENT

| NAME | MARU SABURO | | PRIMARY EVALUATOR | SANKAKU JIRO | TARGET PERIOD | OCTOBER, 2022 to MARCH, 2023 |
|---|---|---|---|---|---|---|
| AFFILIATION | 1ST R&D DEPARTMENT | 2ND R&D SECTION | SECONDARY EVALUATOR | SHIKAKU TARO | | |

DEPARTMENT

| TARGET ITEM | WEIGHT | SELF-EVALUATION | | PRIMARY EVALUATION | | SECONDARY EVALUATION | |
|---|---|---|---|---|---|---|---|
| | | ACHIEVEMENT RATE | WEIGHT | ACHIEVEMENT RATE | WEIGHT | ACHIEVEMENT RATE | WEIGHT |
| TO DO THE ITEM "X" | 3 | | | | | | |

THEME

| TARGET ITEM | WEIGHT | SELF-EVALUATION | | PRIMARY EVALUATION | | SECONDARY EVALUATION | |
|---|---|---|---|---|---|---|---|
| | | ACHIEVEMENT RATE | WEIGHT | ACHIEVEMENT RATE | WEIGHT | ACHIEVEMENT RATE | WEIGHT |
| TO COMPLETE THE DELTA DEVELOPMENT | 3 | | | | | | |
| RELEASE AND OPERATE THE DELTA | 2 | | | | | | |

PERSONAL

| TARGET ITEM | WEIGHT | SELF-EVALUATION | | PRIMARY EVALUATION | | SECONDARY EVALUATION | |
|---|---|---|---|---|---|---|---|
| | | ACHIEVEMENT RATE | WEIGHT | ACHIEVEMENT RATE | WEIGHT | ACHIEVEMENT RATE | WEIGHT |
| TO IMPROVE THE ITEM "Y" | 1 | | | | | | |
| TO MASTER THE TECHNOLOGY "Z" | 1 | | | | | | |

FIG. 8

| DOCUMENT TYPE | KEYWORD 1 | KEYWORD 2 | KEYWORD 3 | KEYWORD 4 |
|---|---|---|---|---|
| CONTRACT | CONTRACT | ADVERSARIA | MEMORANDUM | AGREEMENT |
| PERSONNEL ASSESSMENT | PERSONNEL ASSESSMENT | EMPLOYEE EVALUATION | PERSONNEL EVALUATION | |
| HEALTH CHECK | HEALTH CHECK | COMPLETE MEDICAL CHECKUP | MEDICAL CHECKUP | |
| DOCUMENT INCLUDING PERSONAL INFORMATION | NAME | TELEPHONE NUMBER | MAIL ADDRESS | |
| OTHER CONFIDENTIAL DOCUMENTS | CONFIDENTIAL | TOP SECRET | | |

FIG. 9A

BEFORE SENDING

| USER | SENT ADDRESS | SENT DOCUMENT TYPE | THE NUMBER OF SENDING | DATE OF THE LAST SENDING |
|---|---|---|---|---|
| USER A | houmu@xyz.com | CONTRACT | 5 | AUGUST 25, 2022 |
| USER B | doc@xyz.com | NON-CONFIDENTIAL DOCUMENT | 36 | MARCH 30, 2022 |
| USER B | doc_new@xyz.com | NON-CONFIDENTIAL DOCUMENT | 12 | SEPTEMBER 2, 2022 |
| USER B | ... | | | |
| ... | | | | |

FIG. 9B

AFTER USER A SENT

| USER | SENT ADDRESS | SENT DOCUMENT TYPE | THE NUMBER OF SENDING | DATE OF THE LAST SENDING |
|---|---|---|---|---|
| USER A | houmu@xyz.com | CONTRACT | 5 | AUGUST 25, 2022 |
| USER A | jinji@xyz.com | PERSONNEL ASSESSMENT | 1 | DECEMBER 12, 2022 |
| USER B | doc@xyz.com | NON-CONFIDENTIAL DOCUMENT | 36 | MARCH 30, 2022 |
| USER B | doc_new@xyz.com | NON-CONFIDENTIAL DOCUMENT | 12 | SEPTEMBER 2, 2022 |
| USER B | ... | | | |
| ... | | | | |

FIG. 10

THIS IS THE FIRST TIME TO SEND THIS
TYPE OF HIGHLY CONFIDENTIAL DOCUMENT TO
THE SPECIFIED ADDRESS. ARE THE ADDRESS
AND THE SENDING SETTING CORRECT?

ADDRESS: jinji@xyz.com
DOCUMENT TYPE: PERSONNEL ASSESSMENT

YES  NO

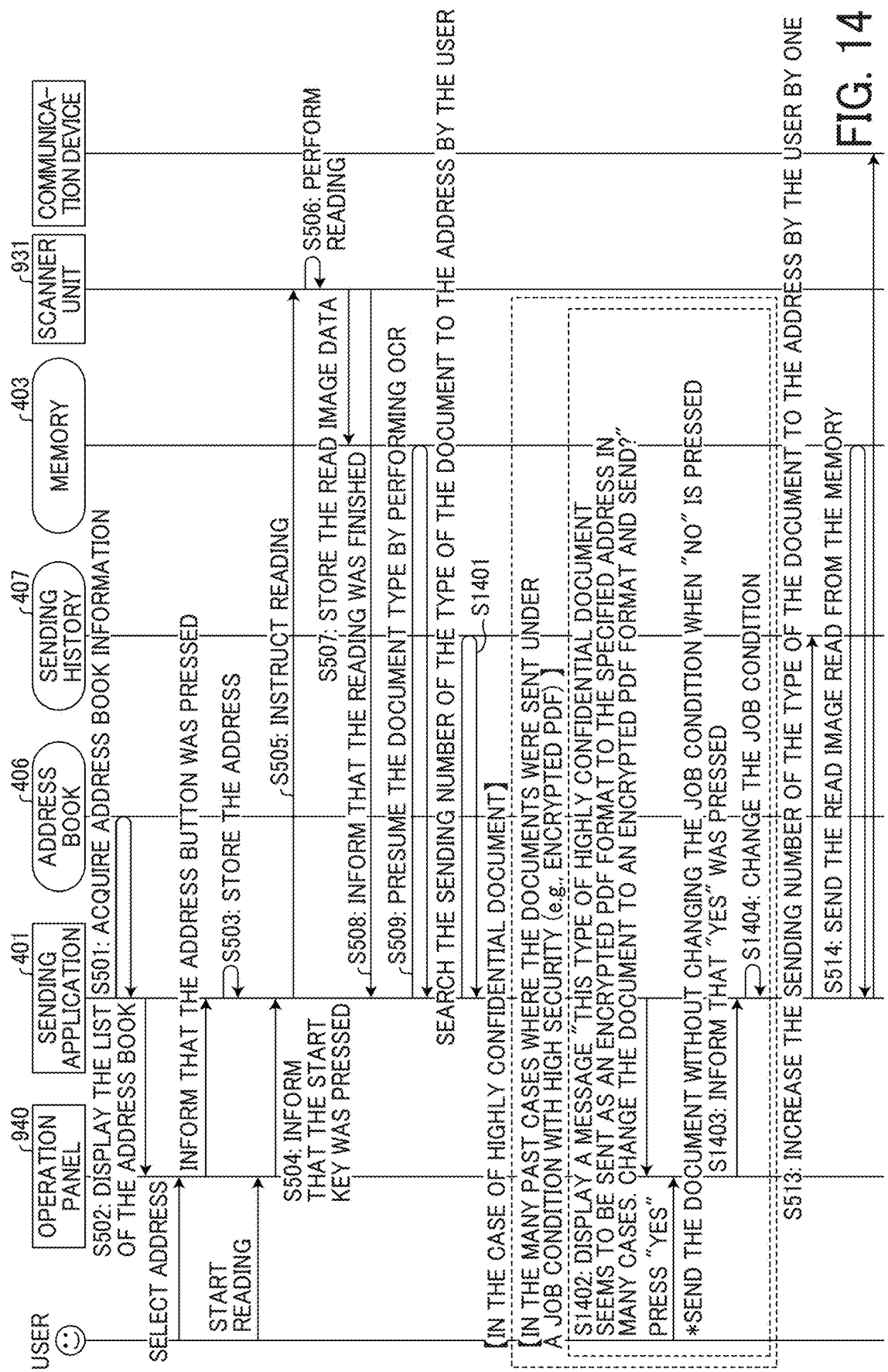

FIG. 15

| USER | SENT ADDRESS | SENT DOCUMENT TYPE | JOB CONDITION ON SECURITY | THE NUMBER OF SENDING | DATE OF THE LAST SENDING |
|---|---|---|---|---|---|
| USER A | houmu@xyz.com | CONTRACT | ENCRYPTED PDF, MAIL ELECTRONIC SIGNATURE | 5 | AUGUST 25, 2022 |
| USER A | jinji@xyz.com | PERSONNEL ASSESSMENT | ENCRYPTED PDF | 10 | DECEMBER 14, 2022 |
| USER A | jinji@xyz.com | PERSONNEL ASSESSMENT | MAIL ENCRYPTION | 1 | DECEMBER 12, 2022 |
| USER B | doc@xyz.com | NON-CONFIDENTIAL DOCUMENT | NON | 36 | MARCH 30, 2022 |
| USER B | doc_new@xyz.com | NON-CONFIDENTIAL DOCUMENT | NON | 12 | SEPTEMBER 2, 2022 |
| USER B | ... | | | | |
| ... | | | | | |

IMAGE READING APPARATUS, IMAGE READING METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2023-044574, filed on Mar. 20, 2023, in the Japan Patent Office, and Japanese Patent Application No. 2023-204196, filed on Dec. 1, 2023, in the Japan Patent Office, the entire disclosures of which are hereby incorporated by reference herein.

BACKGROUND

Technical Field

Embodiments of the present disclosure relate to an image reading apparatus, an image reading method, and a non-transitory recording medium.

Related Art

In the case where an image forming apparatus sends a mail, a folder, or a facsimile, a technology that executes optical character recognition (OCR) processing to a scanned image of a document, identifies a type of the document, automatically determines whether the document is safe in the case where the document is sent as it is, and displays a warning to the user has been developed. In the related art, a technology that displays a frequent job condition as a recommended job condition from a sending history of a job condition including address is known.

SUMMARY

According to an embodiment of the present disclosure, an image reading apparatus includes a scanner to read a document, a memory to store an address and a job condition of the document read by the scanner, and circuitry to identify a user, send the document read by the scanner to the address under the job condition, determine whether a type of the document read by the scanner is a confidential document, search a number of times the confidential document has been sent to the address in the memory when the type of the document is determined as the confidential document, and display, on a screen, a message whether to send the document read by the scanner to the address under the job condition when the number of the times is less than a predetermined times.

According to an embodiment of the present disclosure, an image reading method includes reading a document by a scanner, identifying a user, storing an address and a job condition of the document read by the scanner in a memory, sending the document read by the scanner to the address under the job condition, determining whether a type of the document read by the scanner is a confidential document, searching a number of times the confidential document has been sent to the address in the memory when the type of the document is determined as the confidential document, and displaying, on a screen, a message whether to send the document read by the scanner to the address under the job condition when the number of the times is less than a predetermined times.

According to an embodiment of the present disclosure, a non-transitory recording medium storing multiple instructions which, when executed by one or more processors, causes the one or more processors to perform a method, includes reading a document by a scanner, identifying a user, storing an address and a job condition of the document read by the scanner in a memory, sending the document read by the scanner to the address under the job condition, and determining whether a type of the document read by the scanner is a confidential document, searching a number of times the confidential document has been sent to the address in the memory when the type of the document is determined as the confidential document, and displaying, on a screen, a message whether to send the document read by the scanner to the address under the job condition when the number of the times is less than a predetermined times.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a diagram illustrating processing of determining the type of document in the information processing system according to the first embodiment of the present disclosure;

FIG. 8 is a diagram illustrating a group of keywords used in determination of the type of document in the information processing system according to the first embodiment of the present disclosure;

FIG. 9A is a diagram illustrating a sending history before sending to be stored in the information processing system according to the first embodiment of the present disclosure;

FIG. 9B is a diagram illustrating a sending history after sending to be stored in the information processing system according to the first embodiment of the present disclosure;

FIG. 10 is a diagram illustrating a confirmation message displayed on the information processing system according to the first embodiment of the present disclosure;

FIG. 14 is a sequence diagram illustrating a flow of erroneous sending prevention processing in an information processing system according to a third embodiment of the present disclosure;

FIG. 15 is a diagram illustrating recording processing of a sending history in the information processing system according to the third embodiment.

Figure 1:
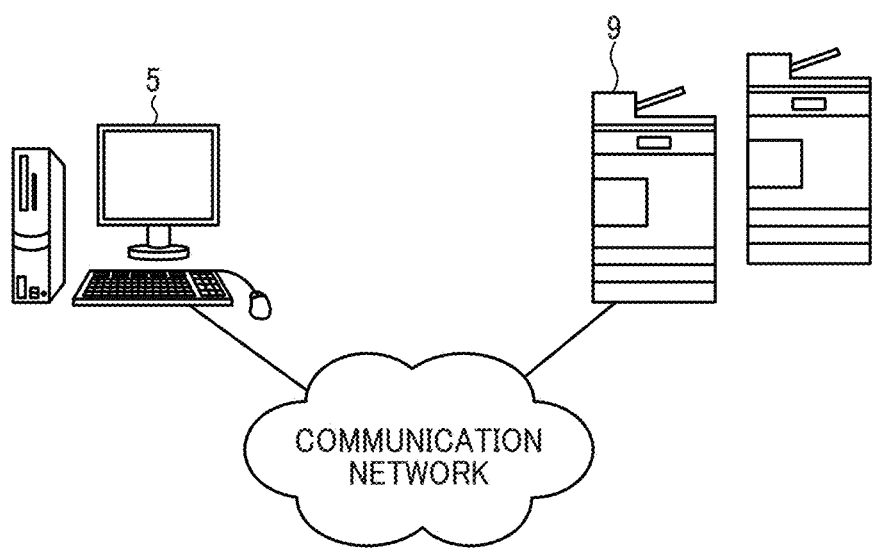
FIG. 1 is a diagram illustrating a configuration of an information processing system according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to an embodiment of the present disclosure, a highly confidential document can be prevented from being erroneously sent.

An image reading apparatus, an image reading method, a non-transitory recording medium, and an information processing system according to embodiments of the present disclosure will be described below with reference to the drawings.

First Embodiment

FIG. 1 is a diagram illustrating a configuration of an information processing system according to a first embodiment of the present disclosure. As illustrated in FIG. 1, the information processing system according to an embodiment of the present disclosure includes a server 5 serving as a server, and a multi-function peripheral (product or printer) (MFP) 9 serving as an image reading apparatus that reads a document and sends the document to an address specified by a user and under a job condition specified by the user.

Figure 2:
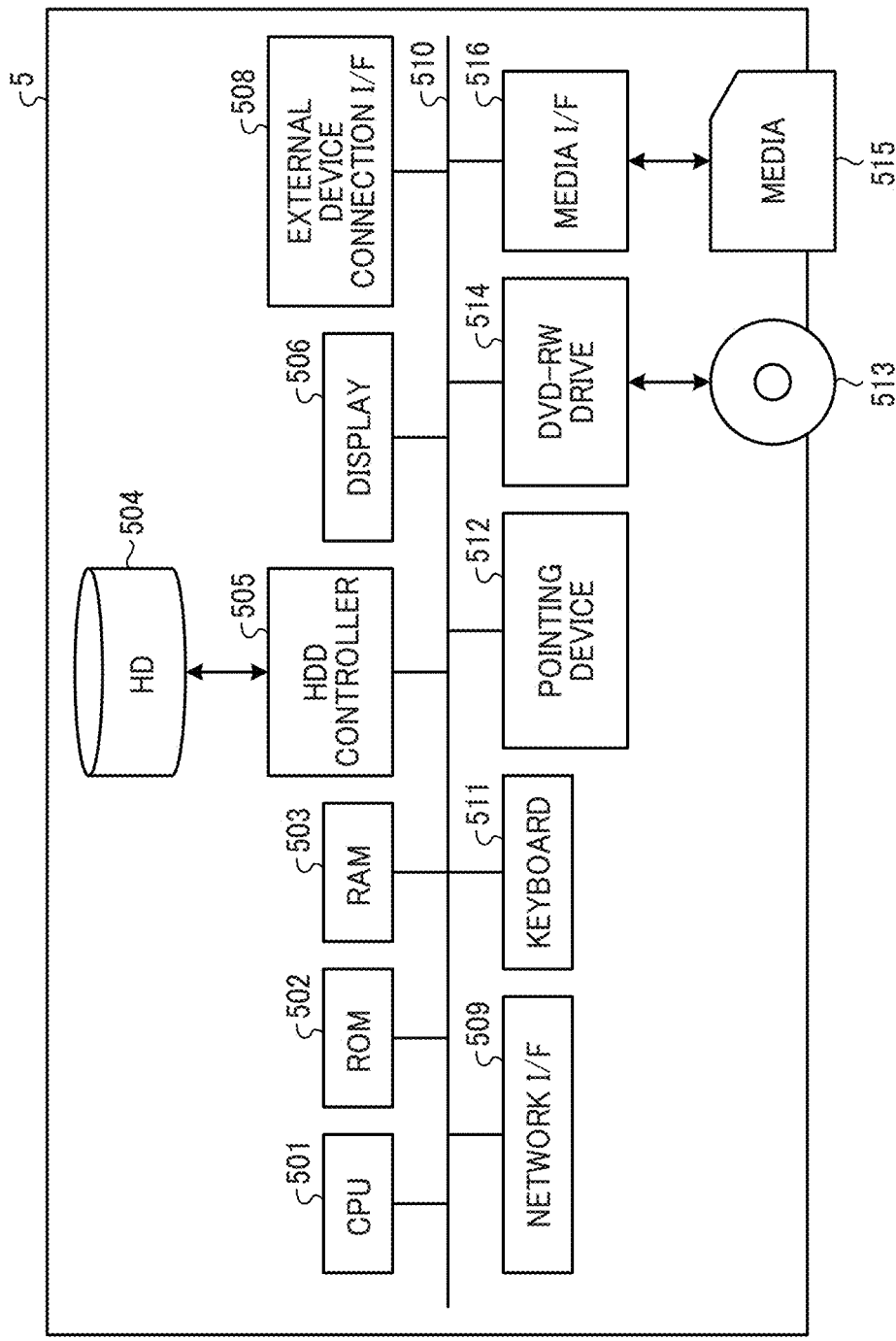
FIG. 2 is a diagram illustrating a hardware configuration of a server according to the first embodiment of the present disclosure.
Figure 5:
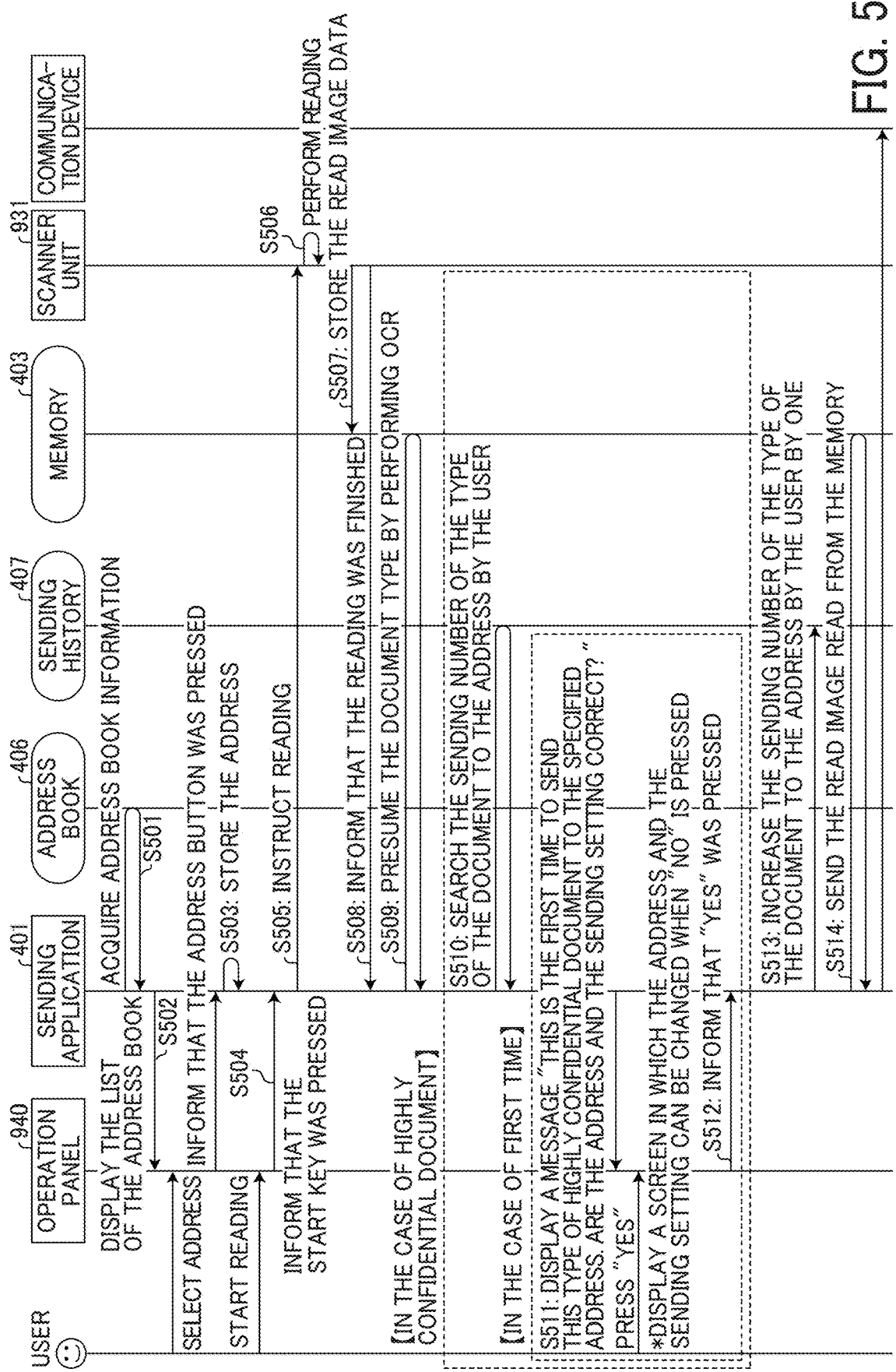
FIG. 5 is a sequence diagram illustrating a flow of erroneous sending prevention processing in an information processing system according to the first embodiment.

FIG. 2 is a diagram illustrating a hardware configuration of a server according to the first embodiment of the present disclosure. As illustrated in FIG. 2, the server 5 includes a computer, and as illustrated in FIG. 5, the server 5 includes a central processing unit (CPU) 501, a read-only memory (ROM) 502, a random-access memory (RAM) 503, a hard disk (HD) 504, a hard disk drive (HDD) controller 505, a display 506, an external device connection interface (I/F) 508, a network I/F 509, a data bus 510, a keyboard 511, a pointing device 512, a digital versatile disk rewritable (DVD-RW) drive 514, and a media I/F 516.

The CPU 501 controls overall operation of the server 5. The ROM 502 stores a program such as an initial program loader (IPL) to boot the CPU 501. The RAM 503 is used for a work area of the CPU 501. The HD 504 stores various data such as programs. The HDD controller 505 controls reading various data from or writing various data to the HD 504 under control of the CPU 501. The display 506 displays various information such as a cursor, a menu, a window, a character, or an image. The external device connection I/F 508 is an interface for connecting various external devices. In this case, the external devices is, for example, a universal serial bus (USB) memory or a printer. The network I/F 509 is an interface for data communication using a communication network. The data bus 510 is an address bus or a data bus for electrically connecting each component such as the CPU 501 illustrated in FIG. 2.

The keyboard 511 serves as an input device including multiple keys for inputting characters, numerical values, and various instructions. The pointing device 512 serves as an input device to select or execute a specific instruction, select a processing target, or move a cursor. The DVD-RW drive 514 controls reading various data from or writing various data to the DVD-RW 513 serving as a removable storage medium. A removable storage medium is not limited to the DVD-RW and may be DVD-R. The media I/F 516 controls reading data from or writing (storing) data to a storage medium 515 such as a flash memory.

Figure 3:
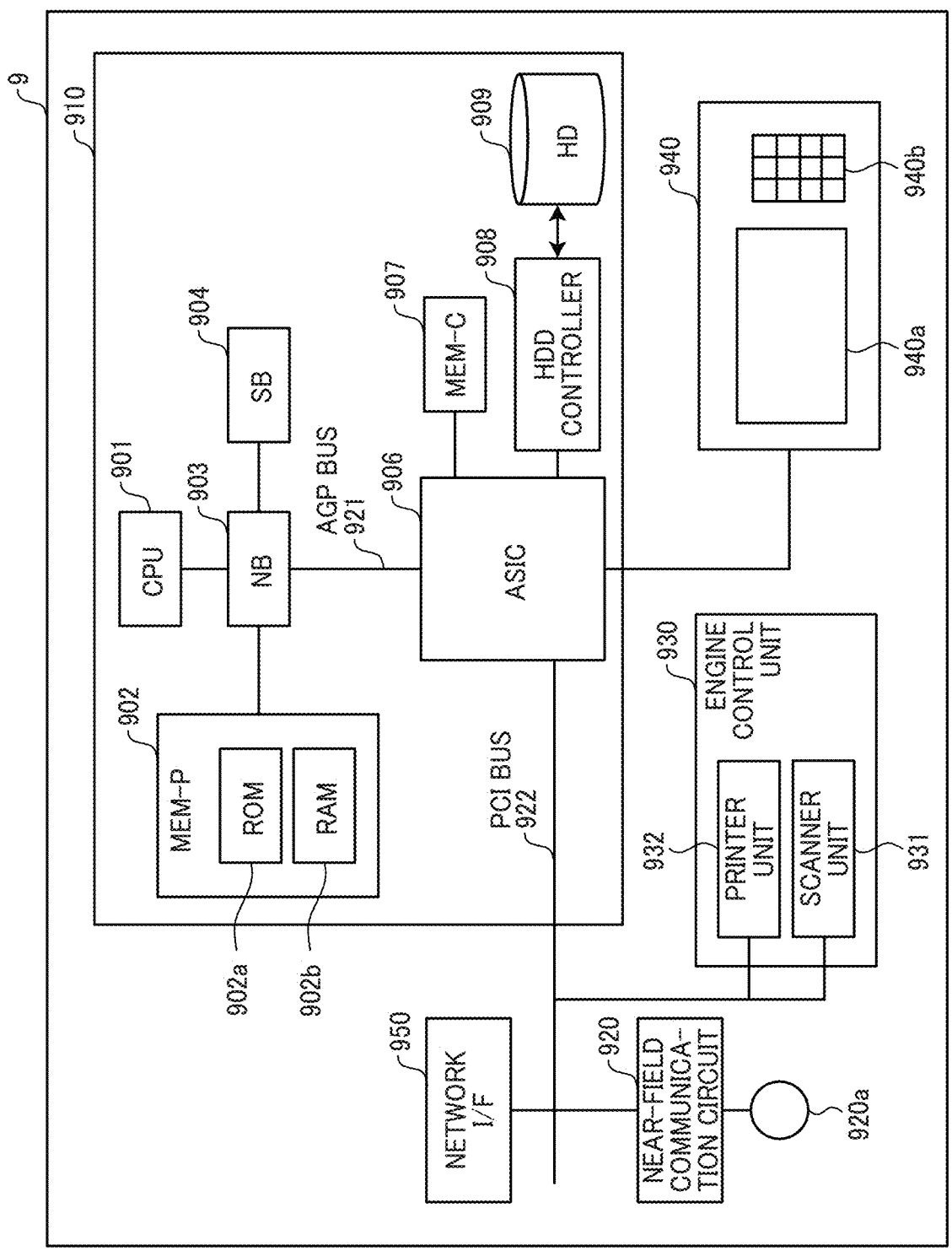
FIG. 3 is a diagram illustrating a hardware configuration of a multi-function peripheral according to the first embodiment of the present disclosure.

FIG. 3 is a diagram illustrating a hardware configuration of an MFP according to a first embodiment of the present disclosure. As illustrated in FIG. 3, the MFP 9 includes a controller 910, a near-field communication circuit 920, an engine control unit 930, an operation panel 940, and a network I/F 950.

Among these components, the controller 910 includes a CPU 901 that is a main part of the computer, a system memory (MEM-P) 902, a north bridge (NB) 903, a south bridge (SB) 904, an application-specific integrated circuit (ASIC) 906, a local memory (MEM-C) 907 as a memory unit, a HDD controller 908, and a hard drive (HD) 909 as a memory, and the NB 903 and the ASIC 906 are connected through accelerated graphics port (AGP) bus 921 in the configuration.

Among these components, the CPU 901 is a control unit to control overall MFP 9. The NB 903 is a bridge for connecting the CPU 901, the MEM-P 902, the SB 904, and the AGP bus 921, and includes a memory controller for controlling reading data from and writing data to the MEM-P 902, a peripheral component interconnect (PCI) master, and an AGP target.

The MEM-P 902 includes a ROM 902a as a storage memory for storing a program (e.g., an operating system and a program such as applications of MFP 9) and data (e.g., a setting value of the device, user information, address, and sending history) for implementing each function of the controller 910, and a RAM 902b to be used for a memory for developing the programs and data and for drawing at a time of memory printing. The program stored in the RAM 902b may be provided by recording the program in a file in an installable or executable format on a computer-readable recording medium such as a compact disc read-only memory (CD-ROM), a compact disc-recordable (CD-R), or a versatile disk (DVD). The RAM 902b is a memory for operating an operating system (OS) and programs such as applications. The RAM 902b is also used to temporarily store the read image data.

The SB 904 is a bridge for connecting the NB 903 to the PCI device and the peripheral devices. The ASIC 906 is an integrated circuit (IC) for image processing having hardware elements for image processing, and serves as a bridge for connecting the AGP bus 921, the PCI bus 922, the HDD controller 908, and the MEM-C 907 to each other. The ASIC 906 includes a PCI target and an AGP master, an arbiter (ARB) that forms the core of the ASIC 906, a memory controller that controls the MEM-C 907, multiple direct memory access controllers (DMAC) that rotate image data by hardware logic, and a PCI unit that transfers data between the scanner unit 931 and the printer unit 932 via the PCI bus 922. The ASIC 906 may be connected to a universal serial bus (USB) interface or an institute of electrical and electronics engineers (IEEE) 1394 interface.

The MEM-C 907 is a local memory used as a copy image buffer and a code buffer. The HD 909 is a storage for storing image data, font data used in printing, and forms. The HD 909 controls reading data from or writing data to the HD 909 under the control of the CPU 901. The AGP bus 921 is a bus interface for graphics accelerator cards that has been suggested to speed up graphics processing, and allows the graphics accelerator cards to be faster by directly accessing the MEM-P 902 at high throughput. The CPU 901 executes various programs such as an OS and applications.

The near-field communication circuit 920 includes a near-field communication circuit 920a. The near-field communication circuit 920 is a communication circuit such as near field communication (NFC) or Bluetooth (registered trademark). The engine control unit 930 includes a scanner unit 931 and a printer unit 932. The scanner unit 931 serves as a reading device that reads a paper document serving as a document. The printer unit 932 is an image forming device that prints a paper document read by the scanner unit 931 or an electronic image sent from a personal computer (PC) on a recording medium such as a transfer paper. However, the image processing system according to an embodiment of the present disclosure may not include the printer unit 932. Accordingly, the image reading apparatus according to an embodiment of the present disclosure is not limited to the MFP 9, and may be a single scanner device. The operation panel 940 includes a panel display 940a such as a touch panel that displays a current setting value and a selection screen and receives input from an operator, and an operation panel 940b including a numeric key to receive a setting value of a condition related to image formation such as a density setting condition and a start key for receiving a copy start instruction. The operation panel 940 is used when the OS and the application display something to the user or receive some instruction from the user. The controller 910 controls the overall MFP 9, and controls, for example, drawing, communication, and input from the operation panel 940. The scanner unit 931 and the printer unit 932 include an image processing function such as error diffusion or gamma conversion.

The MFP 9 can sequentially switch the document box function, the copy function, the printer function, and the facsimile function by the application switch key of the operation panel 940 and select one function. When the document box function is selected, the document box mode is selected, when the copy function is selected, the copy mode is selected, when the printer function is selected, the printer mode is selected, and when the facsimile function is selected, the facsimile mode is selected. The network I/F 950 is an interface that controls data communication with an external device through the communication network 100. In other words, the network I/F 950 is used to communicate with other devices on the communication network. The near-field communication circuit 920 and the network I/F 950 are electrically connected to the ASIC 906 via the PCI bus 922.

Figure 4:
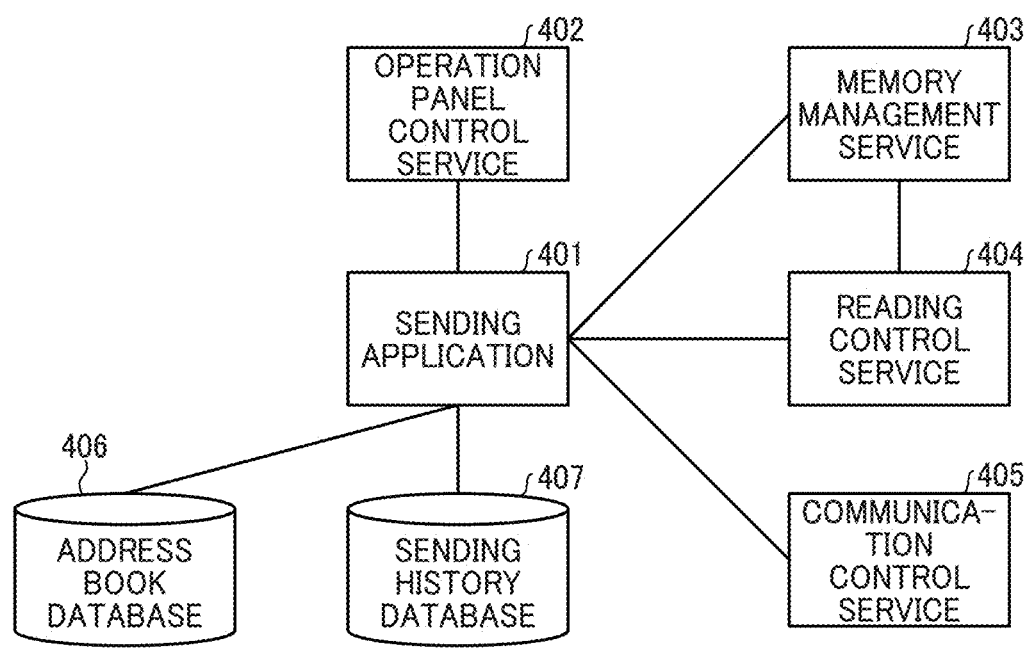
FIG. 4 is a diagram illustrating a functional configuration of the multi-function peripheral according to the first embodiment of the present disclosure.

FIG. 4 is a diagram illustrating a functional configuration of the MFP according to the first embodiment of the present disclosure. As illustrated in FIG. 4, the MFP 9 according to an embodiment of the present disclosure includes a sending application 401, an operation panel control service 402, a memory management service 403, a reading control service 404, a communication control service 405, an address book database 406, and a sending history database 407. The application is a program that implements functions (e.g., a function that reads a document and sends a mail of the document and a function that reads a document and prints the document) provided to the user. The service is a program that provides functions (e.g., a function that reads a document by controlling a scanner unit in response to an instruction from the application and a function that displays a screen on an operation panel in response to an instruction from the application) required in common for the application.

In an embodiment of the present disclosure, a non-transitory recording medium storing multiple instructions which, when executed by one or more processors, causes the one or more processors to perform a method, includes reading a document by a scanner, identifying a user, storing an address and a job condition of the document read by the scanner in a memory, sending the document read by the scanner to the address under the job condition, and determining whether a type of the document read by the scanner is a confidential document, searching a number of times the confidential document has been sent to the address in the memory when the type of the document is determined as the confidential document, and displaying, on a screen, a message whether to send the document read by the scanner to the address under the job condition when the number of the times is less than a predetermined times.

In an embodiment of the present disclosure, an information processing system includes a server, and an image reading apparatus including a scanner to read a document, a memory to store an address and a job condition of the document read by the scanner, and circuitry to identify a user, send the document read by the scanner to the address under the job condition, determine whether a type of the document read by the scanner is a confidential document, search a number of times the confidential document has been sent to the address in the memory when the type of the document is determined as the confidential document, and display, on a screen, a message whether to send the document read by the scanner to the address under the job condition when the number of the times is less than a predetermined times.

The sending application 401 implements functions such as facsimile sending, and mail or folder sending. Specifically, the sending application 401 serves as an identification unit that identifies a user who uses the MFP 9 serving as the image reading apparatus. In other words, the sending application identifies a user who has logged in the MFP 9. The sending application 401 serves as a determination unit that determines a type of the document read by the scanner unit 931 (read document). For example, the sending application 401 may determine a type of the read document by the optical character recognition (OCR) technology.

Further, in the case where the determined type is a highly confidential type, the sending application 401 refers to a sending history database 407 (serving as a history information storage unit) described later to confirm the number of times highly confidential-type documents have been sent to an address specified by the user. The sending application 401 serves as a display control unit that displays a message on a display unit such as the operation panel 940 to the user, and the message enables the user to execute confirmation processing as to whether the document is allowed to be sent to an address specified by the user under job conditions specified by the user. Accordingly, since the sending application 401 presumes whether the address to which the document is sent is appropriate based on the sending history including the type of document that the user sent in the past and the address to which the user sent the document in the past, the sending application 401 can prompt the user to confirm the presumed result, and erroneous sending of the highly confidential document can be prevented. For example, the sending frequency is the number of times of sending documents (including 0) calculated based on the sending history.

In an embodiment of the present disclosure, an image reading apparatus includes a scanner to read a document, a memory to store an address and a job condition of the document read by the scanner, and circuitry to identify a user, send the document read by the scanner to the address under the job condition, determine whether a type of the document read by the scanner is a confidential document, search a number of times the confidential document has been sent to the address in the memory when the type of the document is determined as the confidential document, and display, on a screen, a message whether to send the document read by the scanner to the address under the job condition when the number of the times is less than a predetermined times.

In addition, in the case where the user sends the document of the determined type to the specified address for the first time, the sending application 401 may display a confirmation message as to whether the document is allowed to be sent on, for example, the operation panel 940. Further, the sending application 401 displays a change screen on, for example, the operation panel 940 that can change the address and job conditions based on the result of the confirmation processing.

In an embodiment of the present disclosure, in the image reading apparatus, the circuitry displays, on a screen, whether to send the document determined as the confidential document to the address when it is a first time to send the document determined as the confidential document to the address.

The operation panel control service 402 displays a user interface (UI) for using the sending application 401 on the screen of the operation panel 940 based on an instruction from the sending application 401. The operation panel control service 402 notifies the sending application 401 when the touch panel or the button is operated.

The memory management service 403 temporarily stores the read image data in the memory.

The reading control service 404 operates the reading device (scanner unit 931) to read a document such as a sheet of paper based on an instruction from the sending application 401 and write the read document as image data in a memory managed by the memory management service 403.

The communication control service 405 controls devices for conducting network communication, such as Ethernet (registered trademark), Wi-Fi (registered trademark), and a modem.

The address book database 406 is a database in which a sending address such as a facsimile number, a mail address, or a folder path, a user who uses the device, and an identification (ID) of the user are registered.

The sending history database 407 is a database in which the number of times of sending and the date of the last sending are recorded for each of the user ID of the user who sent the document, the address of the sending, and the type of the sending document. In other words, the sending history database 407 serving as history information storage unit that stores the job conditions (e.g., user ID, address, type of document, number of times to send a document, and sending date) when the document was sent by the user in the past.

FIG. 5 is a sequence diagram illustrating a flow of erroneous sending prevention processing in an information processing system according to the first embodiment. With reference to FIG. 5, a flow of erroneous sending prevention processing in an information processing system according to the first embodiment will be described below.

The user logs in the MFP 9. For example, when the user logs in the MFP 9 by inputting a username and a password, or by holding an integrated circuit (IC) card distributed to each user over a card reader. The sending application 401 (scanner application) acquires an address book from the address book database 406 (step S501). The sending application 401 displays the address book on the operation panel 940 via the operation panel control service 402 (step S502).

When an address was selected by the user from the address book displayed on the screen of the sending application 401 (scanner application) or an email address is directly input by the user, the sending application 401 temporarily stores the address (step S503). When a document is set in the MFP 9 by the user and a reading start button of the operation panel 940 (step S504) is pressed by the user, the sending application 401 instructs the scanner unit 931 (reading device) to read the document (step S505). The scanner unit 931 (reading device) reads the document and stores the image data of the document in the memory (steps S506 and S507), and notifies the sending application 401 of the completion of reading (step S508).

The sending application 401 executes the OCR with reference to the image data stored in the memory, and presumes (determines) the type of the document (step S509). In the case where the determined type of document is a highly confidential type, the sending application 401 searches the number of times that the highly confidential type of documents have been sent to the address selected by the login user from the sending history database 407 (step S510). The highly confidential type of document may include, for example, a document in which a description such as "confidential" or "top secret" is printed on the upper side of the document, or a document in which a character string that is considered to be a title of the document includes "contract", "personnel evaluation", or "medical examination". For example, these terms and keywords are registered in the dictionary database, and in the case where it is found that the text data obtained by the OCR incudes these terms (keywords) through searching, it may be determined that the type of the document is a highly confidential type. Alternatively, a learning model that learns a document and a type of the document by machine learning may be stored in the MFP 9, and the type of a document may be determined by using the learning model.

In an embodiment of the present disclosure, in the image reading apparatus, the circuitry performs an optical character reading to read the document read by the scanner and determines the type of the document read by the optical character reading.

In the case where a highly confidential document has never been sent before by the user, the sending application 401 displays a message of "This is the first time to send this type of highly confidential document to the specified address. Are the address and sending settings correct?" on the operation panel 940 (step S511). In the case where the "YES" button is pressed by the user, the process proceeds to the next step (step S512), but in the case where the "NO" button is pressed by the user, the sending application 401 displays a screen on which the address and the sending settings can be changed on the operation panel 940.

In an embodiment of the present disclosure, in the image reading apparatus, the circuitry is further configured to display, on the screen, a change screen to change the address and the job condition when the document read by the scanner has not been sent to the address under the job condition.

If the "YES" button has been pressed or a document has been sent to the address in the past by the user, as the following step, the sending application 401 updates the sending history information by increasing the number of times to send this type of document to the address by the user by one (step S513). Then, the sending application 401 reads the image data from the memory and sends the image data to the address via the communication device (step S514).

FIG. 6 is a sequence diagram illustrating processing of determining the type of document in the information processing system according to the first embodiment of the present disclosure. As illustrated in FIG. 6, for example, based on a document relating to personnel evaluation, the processing of determining the type of document by the OCR technology will be described.

When the OCR is applied to the document illustrated in FIG. 6, character strings such as "personnel assessment", "target period", and "name" are obtained in order from the top of the document. The sending application 401 checks whether there is a character string included in a keyword group representing a type of document defined in advance or registered by the user among these character strings, and "personnel assessment" is found. As a result, the sending application 401 determines that the document relates to personnel assessment.

In an embodiment of the present disclosure, in the image reading apparatus, the circuitry determines the type of the document determined by the user as a type of the document read by the scanner.

Figure 7:
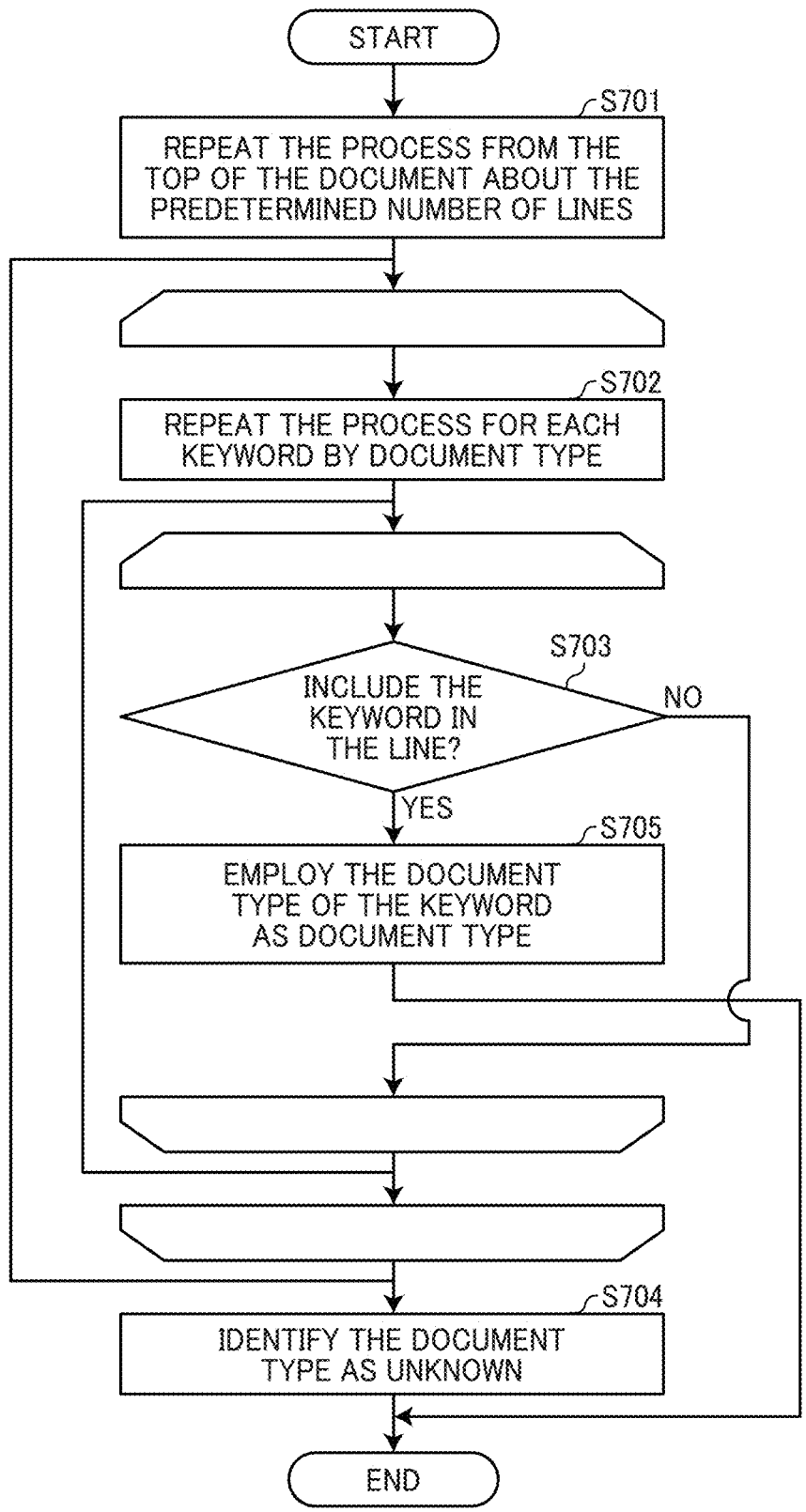
FIG. 7 is a flowchart of the processing of determining the type of document in the information processing system according to the first embodiment of the present disclosure.

FIG. 7 is a flowchart of the processing of determining the type of document in the information processing system according to the first embodiment of the present disclosure. For example, a flow of the processing of determining the type of document will be described with reference to FIG. 7.

The sending application 401 repeats the following process for the predetermined number of lines in order from the top line of the document (step S701). Since the character string indicating the type of the document is often located at the upper part of the document, the sending application 401 extracts about several lines from the upper part of the document from the result of the OCR. Then, the sending application 401 repeats the process that searches a keyword included in the extracted lines for each keyword included in the keyword group (step S702). If no keyword is found in all the lines of the document (step S703: No), the sending application 401 determines that the type of the document is unknown (step S704). If the keyword is found (step S703: Yes), the sending application 401 adopts the type corresponding to the found keyword as the type of the document (step S705).

FIG. 8 is a diagram illustrating a group of keywords used in determination of the type of document in the information processing system according to the first embodiment of the present disclosure. In the case where there are keywords such as "contract", "personnel assessment", "health check", "document including personal information", and "other confidential documents" as the types of highly confidential documents, the sending application 401 has a character string of a keyword representing each of the types of highly confidential documents. These keywords may be defined in advance and may not be changeable by the user, or may be changeable or registered by the user.

Multiple keywords can be set for each highly confidential document. In the first embodiment of the present disclosure, four keywords at a maximum are set in each document, but more keywords or fewer keywords may be set. For example, keywords such as "contract", "adversaria", "memorandum", and "agreement" may be set in a contract of a highly confidential document. When the sending application 401 executes the OCR to the document, and if there is a character string that matches such a keyword at the upper portion of the document, the sending application 401 determines that the document is a contract document.

FIGS. 9A and 9B are diagrams illustrating a sending history to be stored in the information processing system according to the first embodiment of the present disclosure. As illustrated in FIGS. 9A and 9B, the sending history database 407 records user ID, sent address, sent document type, the number of times of sending documents, and date of the last sending. For example, in the case where a document related to personnel assessment is read and sent to the address of "jinji@xyz.com" by the user A, the sending history database 407 "before sending" as illustrated in FIG. 9A includes no sending history of documents related to personnel assessment before sending the document. Accordingly, the sending application 401 displays a message of "This is the first time to send this type of highly confidential document to the specified address. Are the address and send settings correct?". Then, after the "YES" button was selected and the document was sent to the address by the user A, a new sending history is stored in the sending history of the document as illustrated in the sending history database 407 of "after the user A sent" as illustrated in FIG. 9B.

FIG. 10 is a diagram illustrating a confirmation message displayed in the information processing system according to the first embodiment of the present disclosure. If the determined type of document has never been sent in the past, as illustrated in FIG. 10, the sending application 401 displays a message of "This is the first time to send this type of highly confidential document to the specified address. Are the address and sending settings correct?", and a confirmation message including the address specified by the user and the type of document presumed (or specified by the user) by the OCR (or another method) below the message described above. Accordingly, it is easy for the user to confirm that the sending of the document is not erroneous sending. In the case where the type of the document presumed by the OCR (or another method) is incorrect, "NO" can be selected by the user because the user finds that the result presumed by the MFP 9 is incorrect.

Figure 11:
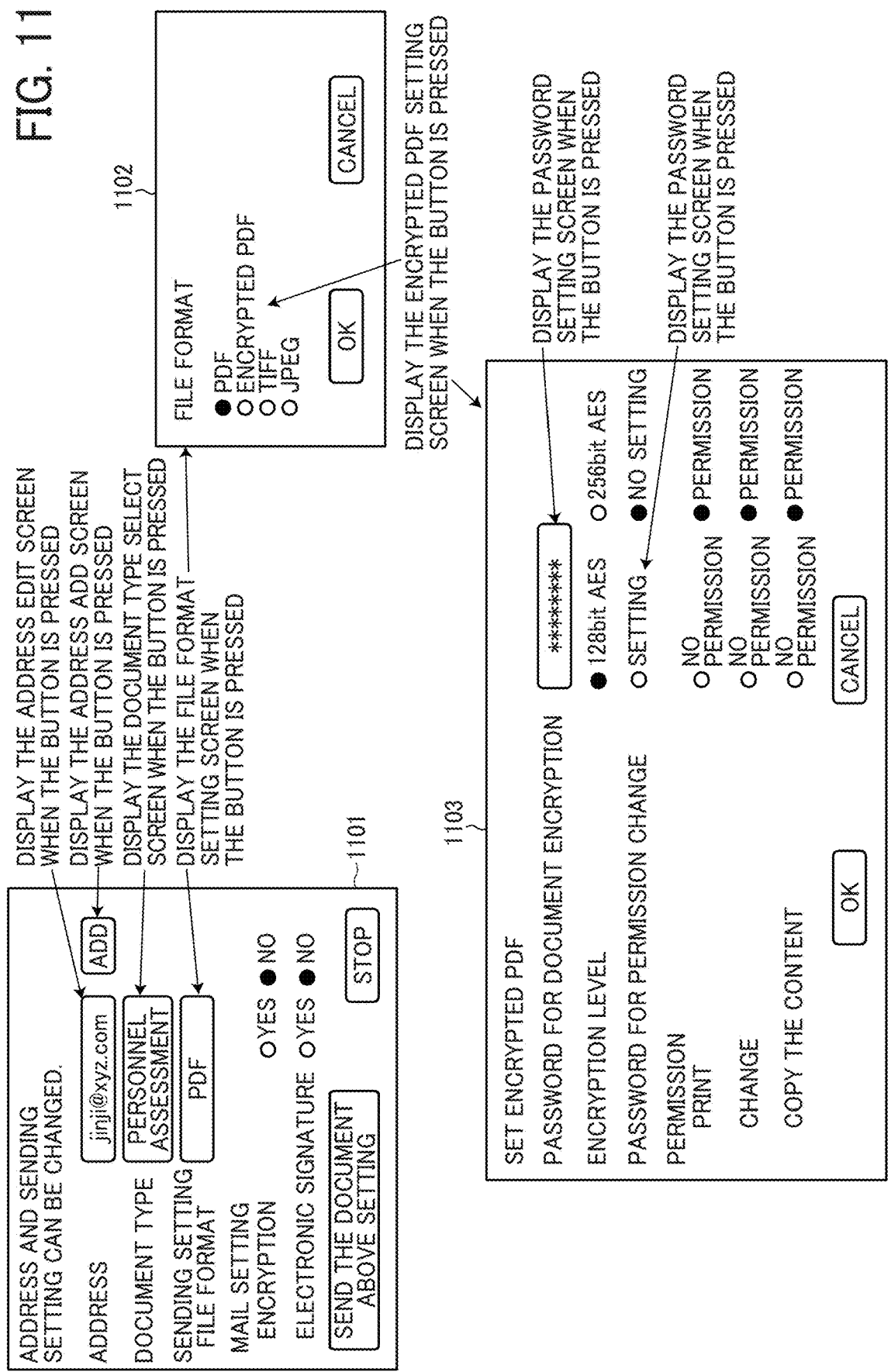
FIG. 11 is a diagram illustrating change screens displayed on the information processing system according to the first embodiment of the present disclosure.

FIG. 11 is a diagram illustrating change screens displayed in the information processing system according to the first embodiment of the present disclosure. Specifically, FIG. 11 is a change screen displayed when "NO" is selected in the confirmation message illustrated in FIG. 10. The sending application 401 displays a change screen 1101 including the address (e.g., jinji@xyz.com) to which a document is to be sent and the document sending settings serving as job conditions (e.g., document type: personnel assessment, file format: PDF, mail encryption: not to be encrypted (NO), and electronic signature: not to be signed (NO)).

When the mail address of the address (the folder path in the case of the folder address) included in the change screen 1101 is pressed, the sending application 401 displays an address edit screen in which the address of the document can be edited. In the case where an address is directly input, the sending application 401 may display a soft keyboard, and in the case where the address is selected from an address book, the sending application 401 may display an address list screen including a list of addresses of the document.

When the document type included in the change screen 1101 is pressed, the sending application 401 displays a type-selection screen (document type setting in FIG. 12) in which the type of the document presumed by the OCR (or another method) can be changed. When the file format included in the change screen 1101 is pressed, the sending application 401 displays a file format setting screen 1102 in which the file format of the document can be set. In this case, four file formats, i.e., portable document format (PDF), encrypted PDF, tagged image file format (TIFF), and joint photographic experts group (JPEG) can be selected.

When the encrypted PDF button included in the file format setting screen 1102 is pressed, the sending application 401 displays the encrypted PDF setting screen 1103. In the encrypted PDF setting screen 1103, a password for document encryption used for encryption of a document can be input, an encryption level can be selected, a password for permission change can be set, and each permission of print, change, and copy of the content can be changed. The setting information of file format (presence or absence of a password for document encryption, encryption level, presence or absence of a password for permission change, and permission setting information) is stored in the sending history database 407 as a job condition when the user sent a document in the past.

In addition, "YES" or "NO" of encryption in the mail settings can be switched on the change screen 1101. In this case, the encryption in the mail settings represents the setting of the encrypted mail sending by secure/multipurpose internet mail extensions (S/MIME), but the encryption by other methods may be used. In addition, "YES" or "NO" of the electronic signature in the mail settings can be switched on the change screen 1101. In this case, the electronic signature in the mail settings represents the setting of the electronic signature by S/MIME, but the electronic signature by other methods may be used. The information on the mail settings (presence or absence of the electronic signature and presence or absence of the encryption) is stored in the sending history database 407 as a job condition when the document was sent in the past by the user.

Figure 12:
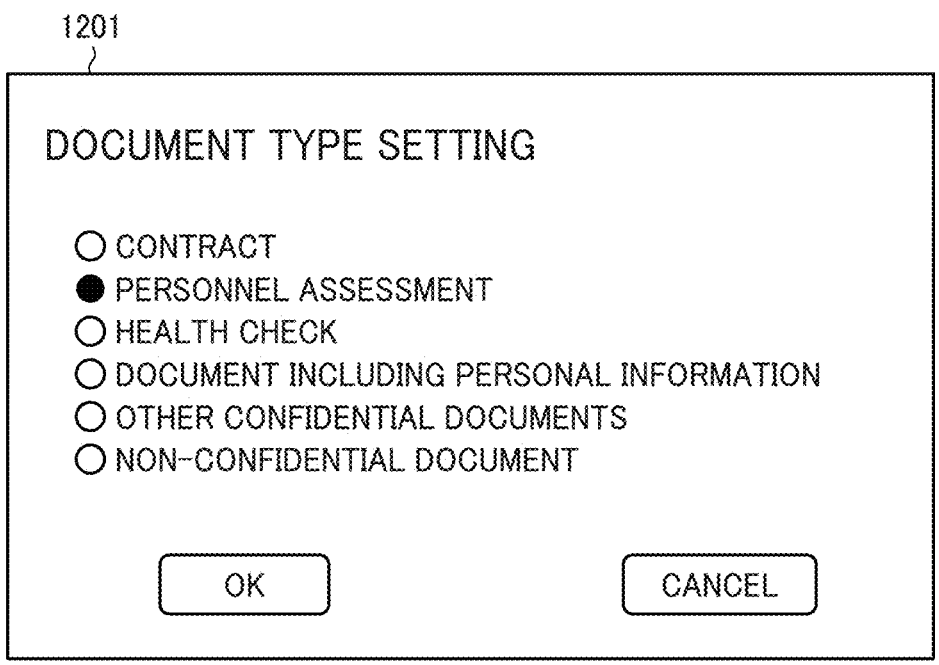
FIG. 12 is a diagram illustrating a type-selection screen displayed on the information processing system according to the first embodiment of the present disclosure.

FIG. 12 is a diagram illustrating a type-selection screen displayed on the information processing system according to the first embodiment of the present disclosure. In the first embodiment of the present disclosure, in the document type selection screen 1201, the type of document can be selected from among six documents, i.e., contract, personnel information, health check, document including personal information, other confidential documents, and non-confidential document. The "non-confidential document" is different from the other five document types and is only selected in the case where the non-confidential document is presumed (or specified by the user) not to be the other highly confidential documents by the OCR (or another method). In the case where the "document type" portion in the change screen 1101 illustrated in FIG. 11 is pressed, the document type presumed by the OCR (or another method) or specified by the user is selected as the initial value. The information on the selected document type is stored in the sending history database 407 as a job condition when the document was sent in the past by the user.

As described above, according to the first embodiment of the present disclosure, the information processing system presumes whether a document is to be sent to an appropriate address based on the sending history of the address and the type of the document sent by the user in the past, and prompts the user to confirm the presumed result. As a result, the information processing system prevents a highly confidential document from being erroneously sent.

Second Embodiment

In the second embodiment of the present disclosure, the type of document determined by the user is determined as the type of a read document. In the following description, the description of the same or like configuration as that of the above-described embodiment is omitted.

In the second embodiment of the present disclosure, the sending application 401 determines the type of document determined by the user to be the type of a document read by the scanner unit 931.

Figure 13:
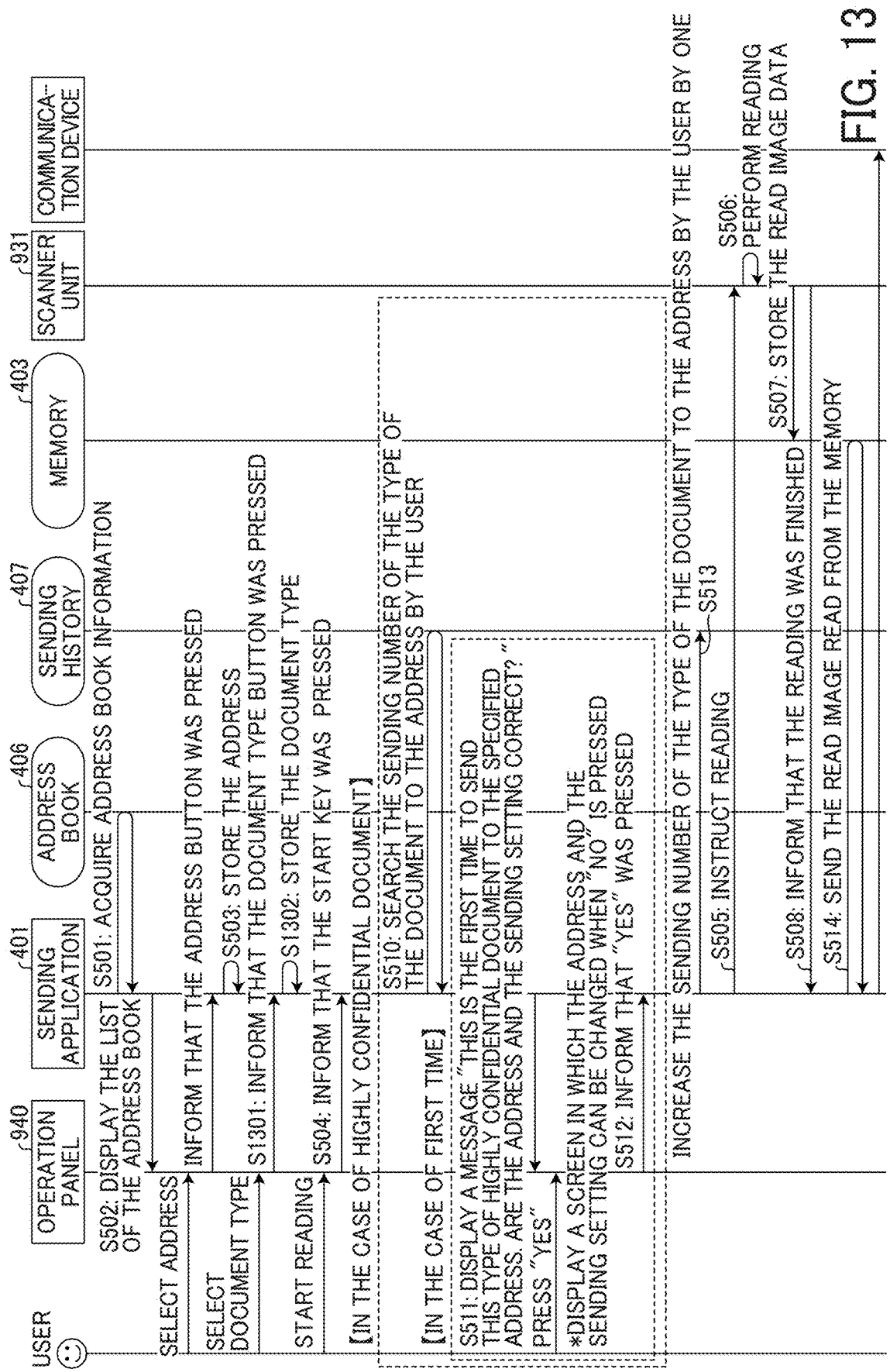
FIG. 13 is a sequence diagram illustrating a flow of erroneous sending prevention processing in an information processing system according to a second embodiment of the present disclosure.

FIG. 13 is a sequence diagram illustrating a flow of erroneous sending prevention processing in an information processing system according to the second embodiment of the present disclosure. In the following description, the description of the same or like processing as that illustrated in FIG. 5 is omitted.

A description is given below of a sequence of the erroneous sending prevention in the case where the type of document is specified by the user. Before the scanner unit 931 starts reading a document, a selection button for selecting a type of document is pressed to select the type of document (step S1301) by the user. The sending application 401 stores the selected type of document (step S1302).

The sending application 401 checks the number of times that the selected type of document has been sent to the address by the user and displays a message (step S511) before instructing the scanner unit 931 to read the document. If "NO" is selected in the message, the sending application 401 does not execute the OCR to the image read by the scanner unit 931. By contrast, if "YES" is selected in the confirmation message (step S512), the sending application 401 proceeds to step S513. The order of the processing in which the address is selected by the user and the processing in which the type of the document is selected by the user may be reversed.

As described above, the information processing system according to the second embodiment of the present disclosure can provide substantially the same operation and effect as those of the first embodiment of the present disclosure.

Third Embodiment

In the third embodiment of the present disclosure, the sending application refers to a sending history and confirms a sending frequency to a specified address specified by the user under a secure job condition in the past, and displays a message that urges the user to confirms whether the specified job condition is acceptable and suggests a change in the job condition to the user. In the following description, the description of the same or like configuration as that of the above-described embodiment is omitted.

In the third embodiment of the present disclosure, the sending application 401 refers to a sending history database 407 and confirms the frequency of sending a document to the address specified by the user under a secure job condition in the past, and displays a message that prompts the user to confirm whether the job condition is acceptable and suggests a change in the job condition to the user on the display of, for example, the operation panel 940. As a result, the sending application 401 can present a selection to automatically change the job condition into a job condition with high security to the user.

In an embodiment of the present disclosure, in the image reading apparatus, the circuitry searches the number of times to send the confidential documents to the address under the job condition in the memory, and displays, on the screen, a massage whether to send the document under the job condition and a proposal of a change of the job condition.

FIG. 14 is a sequence diagram illustrating a flow of erroneous sending prevention processing in an information processing system according to the third embodiment of the present disclosure. Specifically, in FIG. 14, in the following description, the description of the same or like processing as that illustrated in FIG. 5 will be omitted.

A sequence that sends a document after confirming whether the job condition is a high security condition will be described below. In the process illustrated in FIG. 5, the number of times of sending a document to the selected address by the logged-in user is checked based on the combination of the type of document and the address, but in the process illustrated in FIG. 14, the number of times that the logged-in user has sent a document to the selected address is checked based on the combination of the type of document, the job condition related to the security, and the address (step S1401).

When documents were often sent a document under a job condition with high security (e.g., in an encrypted PDF format) in the past, the sending application 401 displays a message on the operation panel 940 as to whether to automatically change the job condition to a job condition with high security (e.g., in an encrypted PDF format with respect to a typical PDF format) (step S1402). In the process illustrated in FIG. 5, when "NO" is selected in the message, the address and sending settings can be changed by the user. By contrast, in the process illustrated in FIG. 14, since the MFP 9 has determined whether the security is high, the MFP 9 presents the user whether to automatically change the job condition to a job condition with high security (e.g., an encrypted PDF format from a typica PDF format).

When the "YES" button was pressed by the user (step S1403), the sending application 401 changes the job condition into a job condition with high security (step S1404). The sending application 401 proceeds to step S513. When a document in the typical PDF format is changed to a document in the encrypted PDF format, at least an encrypted password is required to set, and thus, it is necessary to display a setting screen for the user to set the password. Accordingly, for example, the encrypted password may be set in the encrypted PDF setting screen 1103 illustrated in FIG. 11.

In an embodiment of the present disclosure, an image reading method includes reading a document by a scanner, identifying a user, storing an address and a job condition of the document read by the scanner in a memory, sending the document read by the scanner to the address under the job condition, determining whether a type of the document read by the scanner is a confidential document, searching a number of times the confidential document has been sent to the address in the memory when the type of the document is determined as the confidential document, and displaying, on a screen, a message whether to send the document read by the scanner to the address under the job condition when the number of the times is less than a predetermined times.

FIG. 15 is a diagram illustrating a sending history of recording processing in the information processing system according to the third embodiment. For example, the sending history recording processing used to determine the frequency based on a combination of the type of the document, the job condition related to the security, and the address will be described with reference to FIG. 15.

In the sending history database 407, the number of columns of "job conditions related to security" is increased in addition to the sending history database 407 illustrated in FIGS. 9A and 9B. As illustrated in FIG. 14, the typical PDF format is selected when a document related to personnel evaluation is to be sent to the address "jinji@xyz.com". However, when the job conditions related to security in sending the same type of documents to the same address are checked in the sending history database 407, it is found that documents with the encrypted PDF format have been sent ten times in the past. Thus, the sending application 401 can propose changing the typical PDF format to the encrypted PDF format to the user.

If there is a sending history that used the same address and the same type of document under job conditions with different securities, the job condition having the largest number of times is adopted among the job conditions, but the job condition may be determined by a different method such as determining the job condition by taking the date of the last sending into consideration.

As described above, the information processing system according to the third embodiment of the present disclosure suggests information whether to automatically change the job condition into a job condition with high security to the user.

Fourth Embodiment

In the fourth embodiment of the present disclosure, the address book database and the sending history database are disposed in an external server outside the MFP. In the following description, the description of the same or like configuration as that of the above-described embodiment is omitted.

Figure 16:
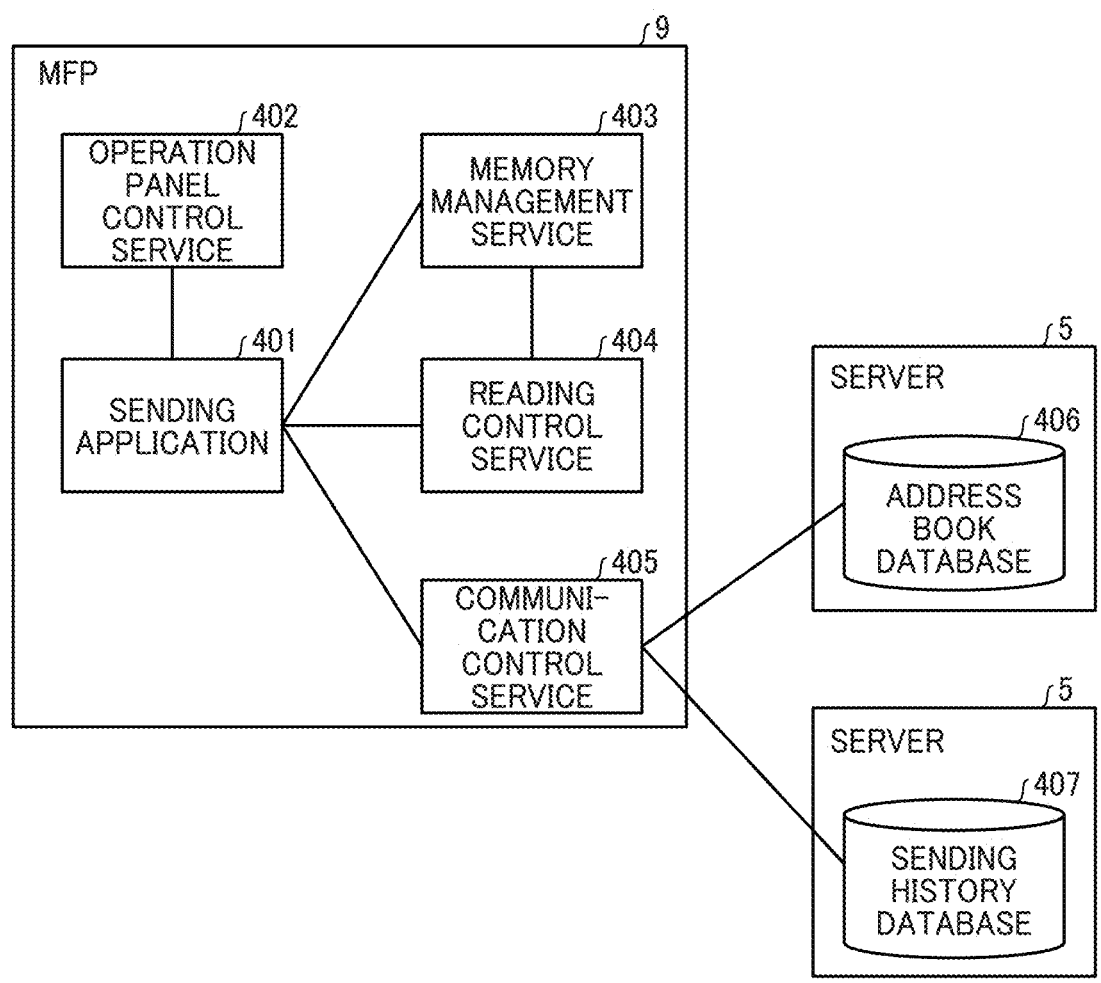
FIG. 16 is a diagram illustrating a functional configuration of an information processing system according to a fourth embodiment of the present disclosure.

FIG. 16 is a diagram illustrating a functional configuration of an information processing system according to the fourth embodiment of the present disclosure. As illustrated in FIG. 16, the MFP 9 according to the fourth embodiment of the present disclosure includes a sending application 401, an operation panel control service 402, a memory management service 403, a reading control service 404, and a communication control service 405. In the fourth embodiment of the present embodiment, the sending application 401 identifies a user who uses the MFP 9 by using the address book database 406 stored in the server 5 outside the MFP 9.

As illustrated in FIG. 16, the server 5 according to the fifth embodiment of the present disclosure includes an address book database 406 and a sending history database 407. In other words, in the functional configuration of the MFP 9 illustrated in FIG. 4, the MFP 9 serving as an image reading apparatus includes the address book database 406 and the sending history database 407 inside the MFP 9, but the address book database 406 and the sending history database 407 may be disposed in the server 5 outside the MFP 9. In this case, the sequences of the erroneous sending prevention processing illustrated in FIGS. 5, 13, and 14 are the same.

However, the only difference is that the MFP 9 accesses the address book database 406 and the sending history database 407 via the communication control service 405.

As described above, the information processing system according to the fourth embodiment of the present disclosure can provide substantially the same operation and effect as those of the above-described embodiments of the present disclosure.

In an embodiment of the present disclosure, in the image reading apparatus, the circuitry identifies the user by using an address book stored in a memory in a server outside the image reading apparatus.

The program to be executed in the MFP 9 according to the fourth embodiment of the present disclosure is provided in advance in the ROM 902a. The program to be executed in the MFP 9 according to the fourth embodiment of the present disclosure may be recorded in a file in an installable or executable format on a computer-readable recording medium such as a CD-ROM, a flexible disk (FD), a CD-R, or a digital versatile disk (DVD) and provided.

Further, the program to be executed in the MFP 9 according to the fourth embodiment of the present disclosure may be stored in a computer connected to a network such as the Internet and provided by being downloaded through the network. Further, the program to be executed in the MFP 9 according to the fourth embodiment of the present disclosure may be provided or distributed through a network such as the Internet.

The program to be executed in the MFP 9 according to the fourth embodiment of the present disclosure includes a module configuration including the above-described components (the sending application 401, the operation panel control service 402, the memory management service 403, the reading control service 404, and the communication control service 405), as actual hardware, the processor such as the CPU 901 reads the program from the ROM 902a and executes the program, the above-described components are loaded onto the main storage device by executing the program, and the sending application 401, the operation panel control service 402, the memory management service 403, the reading control service 404, and the communication control service 405 are generated on the main storage device.

The functions of the embodiments described above can be achieved by one or multiple processing circuits. The "processing circuit" in the present specification includes a processor programmed to execute each function by software, such as a processor implemented by an electronic circuit, and devices such as an ASIC, a digital signal processor, a field-programmable gate array (FPGA), and a conventional circuit module designed to execute each function described above.

The devices described in the embodiments of the present disclosure are only one of multiple computing environments for implementing the embodiments of the present disclosure. In an embodiment of the present disclosure, MFP 9 includes multiple computing devices, such as a server cluster. The multiple computing devices are configured to communicate with each other via any type of communication link including a network or shared memory to perform the processing disclosed in the embodiments of the present disclosure. Similarly, the server 5 may include multiple computing devices configured to communicate with each other. Similarly, the functions of the MFP 9 can be implemented by the server 5. The elements of the MFP 9 and the server 5 may be combined as one server device or may be divided into multiple devices.

Aspects of the present disclosure are as follows, for example.

First Aspect

An image reading apparatus that reads a document and sends the document to an address specified by a user under a job condition specified by the user includes an identification unit to identify the user using the image reading apparatus, a sending history information storing unit to store a job condition at a time when the user sent a document in the past, and a determination unit to determine a read document, and a display control unit to refer to the sending history information storing unit, check the frequency of the sending of a highly confidential document to the address, and display a screen to conduct confirmation processing to confirm whether the document is sent to the address under the job condition to the user in the case where the type of the read document is a type of a highly confidential document.

Second Aspect

In the image reading apparatus according to the first aspect, the display control unit displays a change screen to change the address and the job condition based on the result of the confirmation processing.

Third Aspect

In the image reading apparatus according to the first or second aspect, the display control unit refers to the sending history information storing unit, confirms a number of times to send a document under a high security job condition to the address in the past, and displays a screen to confirm whether the job condition is correct and proposes a change of the job condition.

Fourth Aspect

The image reading apparatus according to any one of the first to third aspects, the identification unit identifies a user using the image reading apparatus using an address book stored in a sever disposed outside the image reading apparatus, and the sending history database is disposed in the server disposed outside the image reading apparatus.

Fifth Aspect

The image reading apparatus according to any one of the first to fourth aspects, the display control unit displays a screen to confirm whether to send the document in the case where to send the document whose type was determined to the address is the first time.

Sixth Aspect

The image reading apparatus according to any one of the first to fifth aspects, the determination unit uses an optical character reader to determine a type of a read document.

Seventh Aspect

The image reading apparatus according to any one of the first to fifth aspects, the determination unit determines a type of a document determined by the user to be a type of a document read by the scanner.

Eighth Aspect

An image reading method that reads a document and send the document to an address specified by a user under a condition specified by the user includes identifying a user using an image reading apparatus and sending a read document to an address specified by the user under a job condition specified by the user, determining a type of the read document, referring to a sending history database storing addresses and job conditions of documents read and sent in the past to search a number of times to send highly confidential documents to the address by the user in a case where the type of the read document is a type of a highly confidential document, and displaying a screen of confirmation processing to confirm whether to send the read document to the address under the job condition.

Ninth Aspect

A non-transitory recording medium storing multiple instructions which, when executed by one or more processors, causes the one or more processors to perform a method, includes identifying a user using an image reading apparatus and sending a read document read to an address specified by the user under a job condition specified by the user, determining a type of the read document, referring a sending history database storing addresses and job conditions of documents read and sent to search a number of times to send highly confidential documents to the address by the user in the case where the type of the read document is a type of a highly confidential document; and displaying a screen of a confirmation processing to confirm whether to send the read document to the address under the job condition.

Tenth Aspect

An information processing system includes a server and an image reading apparatus to read a document and send the document to an address specified by a user under a job condition specified by a user. The server includes a sending history database to store addresses and job conditions of documents read and sent. The image reading apparatus includes an identification unit to identify a user using the image reading apparatus, a determination unit to determine a type of a document read, and a display control unit to refer to the sending history database to search a number of times to send highly confidential documents to the address by the user in a case where the type of the read document is a type of a highly confidential document and display a screen of a confirmation processing to confirm whether to send the read document to the address under the job condition.

Eleventh Aspect

An image reading apparatus includes a scanner to read a document, a memory to store an address and a job condition of the document read by the scanner, and circuitry to identify a user, send the document read by the scanner to the address under the job condition, determine whether a type of the document read by the scanner is a confidential document, search a number of times the confidential document has been sent to the address in the memory when the type of the document is determined as the confidential document, and display, on a screen, a message whether to send the document read by the scanner to the address under the job condition when the number of the times is less than a predetermined times.

Twelfth Aspect

In the image reading apparatus according to the eleventh aspect, the circuitry displays, on the screen, a change screen to change the address and the job condition when the document read by the scanner has not been sent to the address under the job condition.

Thirteenth Aspect

In the image reading apparatus according to the eleventh or twelfth aspect, the circuitry searches the number of times to send the confidential documents to the address under the job condition in the memory, and displays, on the screen, a massage whether to send the document under the job condition and a proposal of a change of the job condition.

Fourteenth Aspect

In the image reading apparatus according to any one of the eleventh to thirteenth aspects, the circuitry identifies the user by using an address book stored in a memory in a server outside the image reading apparatus.

Fifteenth Aspect

In the image reading apparatus according to any one of the eleventh to fourteenth aspects, the circuitry displays, on a screen, whether to send the document determined as the confidential document to the address when it is a first time to send the document determined as the confidential document to the address.

Sixteenth Aspect

In the image reading apparatus according to any one of the eleventh to fifteenth aspects, the circuitry performs an optical character reading to read the document read by the scanner and determines the type of the document read by the optical character reading.

Seventeenth Aspect

In the image reading apparatus according to any one of the eleventh to fifteenth aspects, the circuitry determines the type of the document determined by the user as a type of the document read by the scanner.

Eighteenth Aspect

An image reading method includes reading a document by a scanner, identifying a user, storing an address and a job condition of the document read by the scanner in a memory, sending the document read by the scanner to the address under the job condition, determining whether a type of the document read by the scanner is a confidential document, searching a number of times the confidential document has been sent to the address in the memory when the type of the document is determined as the confidential document, and displaying, on a screen, a message whether to send the document read by the scanner to the address under the job condition when the number of the times is less than a predetermined times.

Nineteenth Aspect

A non-transitory recording medium storing multiple instructions which, when executed by one or more processors, causes the one or more processors to perform a method, includes reading a document by a scanner, identifying a user, storing an address and a job condition of the document read by the scanner in a memory, sending the document read by the scanner to the address under the job condition, and determining whether a type of the document read by the scanner is a confidential document, searching a number of times the confidential document has been sent to the address in the memory when the type of the document is determined as the confidential document, and displaying, on a screen, a message whether to send the document read by the scanner to the address under the job condition when the number of the times is less than a predetermined times.

Twentieth Aspect

An information processing system includes a server, and an image reading apparatus including a scanner to read a document, a memory to store an address and a job condition of the document read by the scanner, and circuitry to identify a user, send the document read by the scanner to the address under the job condition, determine whether a type of the document read by the scanner is a confidential document, search a number of times the confidential document has been sent to the address in the memory when the type of the document is determined as the confidential document, and display, on a screen, a message whether to send the document read by the scanner to the address under the job condition when the number of the times is less than a predetermined times.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An image reading apparatus comprising:
a scanner to read a document;
a memory to store an address and a job condition of the document read by the scanner; and
circuitry configured to:
identify a user;
send the document read by the scanner to the address under the job condition;
determine whether a type of the document read by the scanner is a confidential document;
search a number of times the confidential document has been sent to the address in the memory when the type of the document is determined as the confidential document; and
display, on a screen, a message whether to send the document read by the scanner to the address under the job condition when the number of the times is less than a predetermined times.

2. The image reading apparatus according to claim 1, wherein the circuitry is further configured to display, on the screen, a change screen to change the address and the job condition when the document read by the scanner has not been sent to the address under the job condition.

3. The image reading apparatus according to claim 1, wherein the circuitry is further configured to:
search the number of times to send the confidential documents to the address under the job condition in the memory; and
display, on the screen,
a message whether to send the document under the job condition; and
a proposal of a change of the job condition.

4. The image reading apparatus according to claim 1, wherein the circuitry is further configured to identify the user by using an address book stored in a memory in a server outside the image reading apparatus.

5. The image reading apparatus according to claim 1, wherein the circuitry is further configured to display, on a screen, whether to send the document determined as the confidential document to the address when it is a first time to send the document determined as the confidential document to the address.

6. The image reading apparatus according to claim 1, wherein the circuitry is further configured to:
perform an optical character reading to read the document read by the scanner; and
determine the type of the document read by the optical character reading.

7. The image reading apparatus according to claim 1, wherein the circuitry is further configured to determine the type of the document determined by the user as a type of the document read by the scanner.

8. An image reading method comprising:
reading a document by a scanner;
identifying a user;
storing an address and a job condition of the document read by the scanner in a memory;
sending the document read by the scanner to the address under the job condition;
determining whether a type of the document read by the scanner is a confidential document;
searching a number of times the confidential document has been sent to the address in the memory when the type of the document is determined as the confidential document; and
displaying, on a screen, a message whether to send the document read by the scanner to the address under the job condition when the number of the times is less than a predetermined times.

9. A non-transitory recording medium storing multiple instructions which, when executed by one or more processors, causes the one or more processors to perform a method, comprising:
reading a document by a scanner;
identifying a user;
storing an address and a job condition of the document read by the scanner in a memory;
sending the document read by the scanner to the address under the job condition; and
determining whether a type of the document read by the scanner is a confidential document;

searching a number of times the confidential document has been sent to the address in the memory when the type of the document is determined as the confidential document; and displaying, on a screen, a message whether to send the document read by the scanner to the address under the job condition when the number of the times is less than a predetermined times.

* * * * *